United States Patent [19]

Stapp et al.

[11] Patent Number: 5,646,374
[45] Date of Patent: Jul. 8, 1997

[54] CONVEYOR FOR A COMBINATION WEIGHER OR THE LIKE

[75] Inventors: Richard E. Stapp, San Lorenzo; David R. Crowson, El Cerrito, both of Calif.

[73] Assignee: The Paxall Group, Inc., Skokie, Ill.

[21] Appl. No.: 354,030

[22] Filed: Dec. 6, 1994

[51] Int. Cl.$^6$ .................. G01G 13/00; G01G 13/02; G01G 23/00
[52] U.S. Cl. .................. 177/25.18; 177/119; 177/162; 198/771; 366/111
[58] Field of Search ............... 198/771; 366/111, 366/112, 114; 177/25.18, 98, 102, 116, 119, 161, 162

[56] References Cited

U.S. PATENT DOCUMENTS

| | | | |
|---|---|---|---|
| 2,714,832 | 8/1955 | Seed et al. | 177/116 |
| 2,832,459 | 4/1958 | Lauer | 177/116 |
| 3,087,602 | 4/1963 | Hinkle, Jr. | 198/771 |
| 3,239,108 | 3/1966 | Warner | 198/771 |
| 3,305,067 | 2/1967 | Mayer | 198/771 |
| 3,320,528 | 5/1967 | Esenwein | 198/771 |
| 3,578,094 | 5/1971 | Henry | 177/119 |
| 3,598,223 | 8/1971 | Lauer | 177/116 |
| 4,339,027 | 7/1982 | Lauer | 177/116 |
| 4,418,771 | 12/1983 | Henry et al. | 177/116 |
| 4,482,046 | 11/1984 | Kraus | 198/771 |
| 4,516,644 | 5/1985 | Fukuda | 177/25.18 |
| 4,569,405 | 2/1986 | Oshima | 177/25.18 |
| 4,607,713 | 8/1986 | Nishi et al. | 177/25.18 |
| 4,787,502 | 11/1988 | Sullivan et al. | 198/771 |
| 4,941,565 | 7/1990 | Hirota et al. | 177/25.18 |
| 5,211,253 | 5/1993 | Davis, Jr. | 177/116 |
| 5,249,859 | 10/1993 | Krynock | 177/116 |
| 5,270,495 | 12/1993 | Mosher et al. | 177/25.18 |
| 5,558,199 | 9/1996 | Roether et al. | 198/771 |

FOREIGN PATENT DOCUMENTS

| | | | |
|---|---|---|---|
| 1162472 | 6/1985 | U.S.S.R. | 366/114 |

*Primary Examiner*—Michael L. Gellner
*Assistant Examiner*—Randy W. Gibson
*Attorney, Agent, or Firm*—David E. Dougherty

[57] ABSTRACT

A vibratory conveyor for a combination weigher or the like includes an elongated trough having inlet and outlet ends and a pair of upwardly extending and outwardly flared side walls. The conveyor also includes a pair of ramps for lifting and slowing a flow of particulate material as it is conveyed along the length of the conveyor. A first of the ramps includes a relatively flat base portion and two sloping side portions that converge at the apex of a V-shaped end portion to bias the flowing material toward the center of the trough. A second ramp has a relatively flat portion and further slows the flow of material so that it drops off of the outlet end of the conveyor in a mere trickle.

4 Claims, 3 Drawing Sheets

CONVEYOR FOR A COMBINATION WEIGHER OR THE LIKE

FIELD OF THE INVENTION

This invention relates to a conveyor for conveying a mass of relatively free flowing particulate material to a combination weigher or the like and more particularly to a vibratory conveyor which includes means for slowing a flow of particulate material so that a trickle of material is delivered to each of the weigh hoppers in a combination weigher.

BACKGROUND FOR THE INVENTION

Combination weighing systems of the type having a plurality of circularly arranged weigh hoppers are well known. For example, the Henry et al. Patent No. 4,418,771 discloses a system wherein a predetermined weight of product is made up of individual articles of varying weights. In the Henry method and apparatus, the predetermined weight is reached by selecting the product stored in a combination of a predetermined number of storage cups. Quantities of the product having targeted weights are distributed to a plurality of scale-controlled hoppers for accurate weighing. The weighted product is fed from each of the scale-controlled hoppers to a plurality of storage cups associated with each of the hoppers, and the product weight associated with each storage cup is registered. Specific combinations of storage cups are tested to determine whether the combined product weights therein add up to make the desired weight, within acceptable limits. The first combination found to make the weight is used, and the appropriate storage cups are emptied to a container for receiving the product. The appropriate storage cups are refilled from the scale, and the process repeats. When none of the combinations of the preselected number of storage cups include a total product weight within the acceptable limits, the limits are broadened and the cycle repeats. The weighing system includes a programmed microprocessor for controlling operation thereof, for providing the combination to be tested, for calculating the combined weights, and for determining whether the combined weight falls within the acceptable limits. A distributor for the product includes a reversing rotating portion for preventing clogging of the product at openings provided for chutes connecting the distributor to the scale-controlled hoppers.

A more recent approach to an improved combination weigher is disclosed in the U.S. Pat. No. 5,211,253 of Thornton Davis which is assigned to the same assignee as the present application and which is incorporated herein in its entirety by reference. As disclosed by Davis, the apparatus comprises means including a plurality of balances each of which is adapted to receive and weigh a fraction of the collection and unload product therefrom to contribute to a delivery. The apparatus also includes means for recording a predetermined target weight and control means for determining which of the balances are in a ready or stable state. Means are also provided for generating the values of combinations of weights on the balances which are in the ready state and for comparing the values with the predetermined target weight and for selecting a combination of balances to be unloaded to deliver a collection of articles having a combined weight which most nearly approximates the target weight. In practice, it may be desirable to select those scales having a combined weight which is at least equal to the predetermined weight to avoid any underweight packages. The apparatus also includes package positioning and signal generating means such as a packaging machine for positioning a package to receive a collection of articles from the selected balances and for generating a signal to indicate that a package is positioned to receive the articles from the balances. Means for unloading the balances of the selected combination for delivery of the product contained therein to a properly positioned package are also provided. Means for generating the values of combinations of weights on the balances which are in the ready state including the originally selected balances and any balances which have reached a ready state subsequent to a first comparison are actuated for comparing the values with the predetermined target weight. In this manner, all of the ready balances are included in the comparison and a second selection having a weight which most nearly approximates the target weight is delivered to a package. Means are also provided for refilling those balances which have been unloaded.

The aforementioned combination weighers normally incorporate a distribution system for delivering solid flowable product to the plurality of scales. In such systems, a cone shaped member is located directly above the infeeds for a plurality of conveyors which direct the product to the various scales. In such devices, a relatively deep pile of product may form on the cone shaped member and cause non-uniform feeding. One approach to overcome this problem is disclosed in a co-pending U.S. patent application entitled, A Distribution System for a Combination Weigher or the Like, Ser. No. 08/178,852 in the name of Richard Stapp and Glen Hayes. That application is assigned to the same assignee as the present invention and is incorporated herein in its entirety by reference.

The aforementioned application overcomes to a large degree the problems associated with prior art distributors, but does not address a particular problem associated with combination weighers wherein the portions being weighed have a relatively low piece count. Low piece counts refer to those portions which are made up of less than about 20 pieces. The problem associated with such counts is to control the product feed so that only 3 or 4 pieces of product are deposited in a weigh bucket for each cycle. One approach to solving this problem includes shaping the vibratory conveyor to provide a thin narrow stream of product to provide a consistent result. However, the effectiveness of the shaped conveyors varies depending on the shape of the product. For example, when the product has edges that tend to bridge, narrow feeders are unsatisfactory.

It is now believed that there is a significant demand for an improved conveyor for a combination weigher or the like. The demand is for a conveyor which will consistently deliver low piece counts to each of a series of scales. The conveyor should also remain consistent for different types and sizes of products, minimize down time for change over to a different product, be relatively simple in design and relatively inexpensive to manufacture. It is also presently believed that an improved conveyor in accordance with the present invention has all of the aforementioned characteristics.

BRIEF SUMMARY OF THE INVENTION

In essence, the present invention contemplates a conveyor for conveying a mass of relatively free flowing solid particulate material to a weigh hopper in a combination weigher or the like. The conveyor includes an elongated trough having an inlet end, a discharge end and a pair of spaced apart walls. The conveyor also includes means for vibrating the trough to enhance a flow of particulate material along the trough. Lift means such as a relatively shallow ramp or inclined plane extends across the trough between the side walls and is disposed between the inlet end and the outlet end of the trough. The lift means connects the side walls so that it elevates essentially all of the particulate material to thereby slow the flow of material along the ramp. The lift means also biases the particulate material which flows along the trough toward the center of the trough. Means such as the slope of the trough and/or the amplitude and/or frequency of vibration and the height of the lift means regulate the flow of particulate material so that a trickle of material is delivered off of the discharge end of the trough to one of the weigh hoppers of the combination weigher.

DESCRIPTION OF THE PREFERRED EMBODIMENTS OF THE INVENTION

Figure 1:
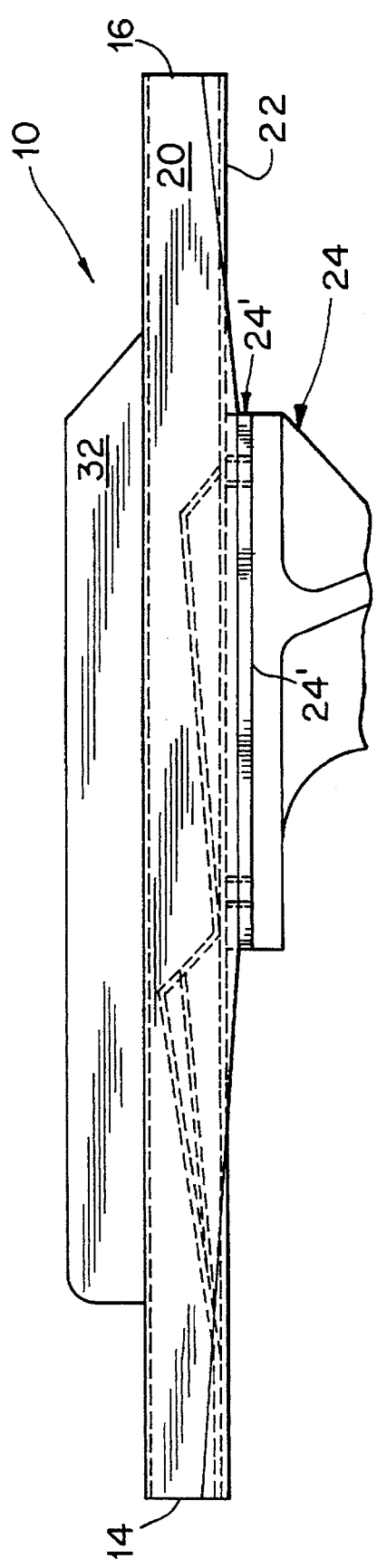
FIG. 1 is a side view of a conveyor in accordance with a preferred embodiment of the invention with the lift means or ramps illustrated by dotted lines.

The best mode of the invention will now be described in connection with the accompanying drawings wherein like reference numerals have been used to identify like parts.

Figure 2:
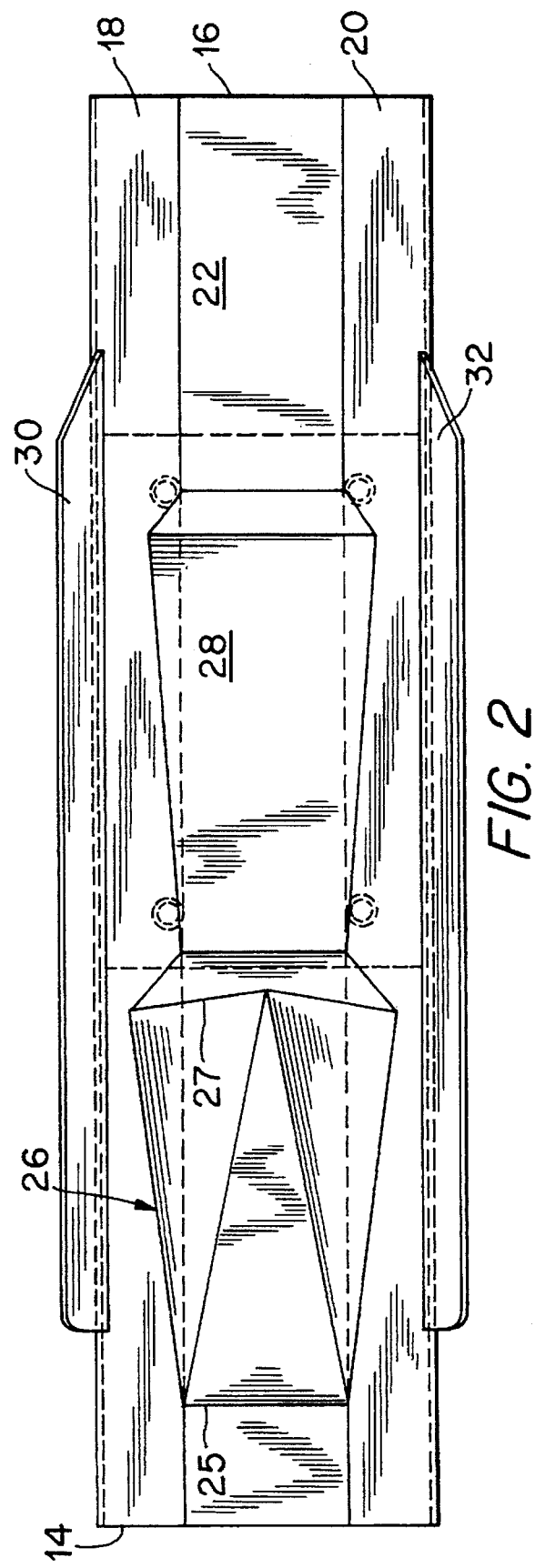
FIG. 2 is a top or plan view of the conveyor shown in FIG. 1.
Figure 3:
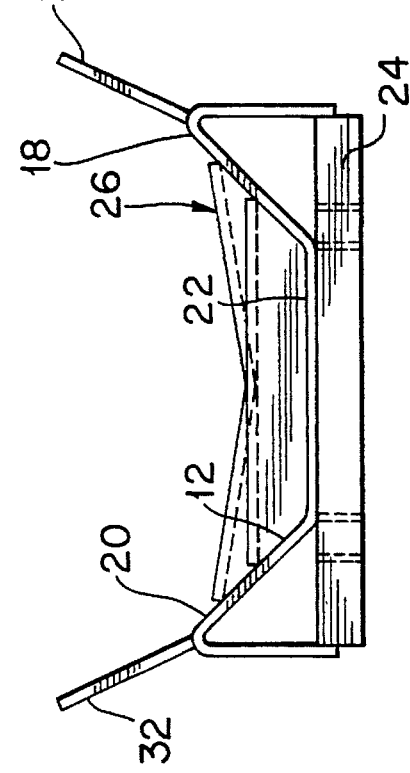
FIG. 3 is an end view of the conveyor shown in FIGS. 1 and 2.

As shown in FIGS. 1 and 2 a vibratory conveyor indicated generally by reference number 10 comprises an elongated trough 12 having an inlet end 14 and a discharge end 16. The trough 12 also includes two upwardly extending side walls 18 and 20 and a base member or bottom 22. The sidewalls 18 and 20 are preferably flared outwardly as shown more clearly in FIG. 3. The trough 12 may also be supported by a suitable frame which is not shown. The conveyor 10 is disposed between a distributer 2 and feed hoppers 6 as indicated by numeral 4 in FIG. 7. A conventional vibrator 24 (shown schematically) is fixed to the bottom of the trough 12 by means of a mounting plate 24' in a customary manner in order to impart vibratory forces thereto to convey solid particulate material from one end of the trough to the other end. The vibrator 24 may be connected to a source of energy such as an electric outlet (not shown) in a conventional manner. The solid particulate or flowable material is introduced at the inlet end 14 by distributer 2 (FIG. 7) and flows downstream toward the discharge end 16 in response to the vibration which is caused by vibrator 24.

As the solid particulate material is conveyed along the trough 12 from the inlet end 14 toward the discharge end 16, it encounters a first lift means or ramp 26. The ramp 26 abuts side walls 18 and 20 and extends across the entire width of the trough 12 so that all of the material conveyed thereby will flow upwardly with respect to conveyor 10 and over the ramp 26. The ramp 26 defines a relatively complex shape with a relatively wide and relatively flat entrance portion 25 which slopes upwardly at a relatively small angle of about 10° until it terminates in a V-shaped exit portion 27.

As the ramp 26 extends downstream the flat portion converges until it meets the apex of the V-shaped exit i.e. the converging sloped portions 31 and 33. For this reason, the outer edges of the ramp 26 which abut side walls 18 and 20 define a slope of about 16° and bias all of the flowing material toward the center of the ramp 26 as it flows off of the exit portion 27 and onto a second lift means or ramp 28 which is relatively flat.

The second ramp 28 also abuts side walls 18 and 20 and extends completely across the trough 12. The second ramp 28 has a slope which is preferably slightly less than the slope of the ramp 26. For example the slope of ramp 28 is preferably about 6°.

The conveyor 10 also includes a pair of upwardly extending extension members 30 and 32 which also extend in a longitudinal direction along the lengths of the ramps 26 and 28. The extension members 30 and 32 are also flared outwardly in the same manner and preferably to the same degree as side walls 18 and 20 and prevent flowing material from flowing over the sidewalls.

Figure 4:
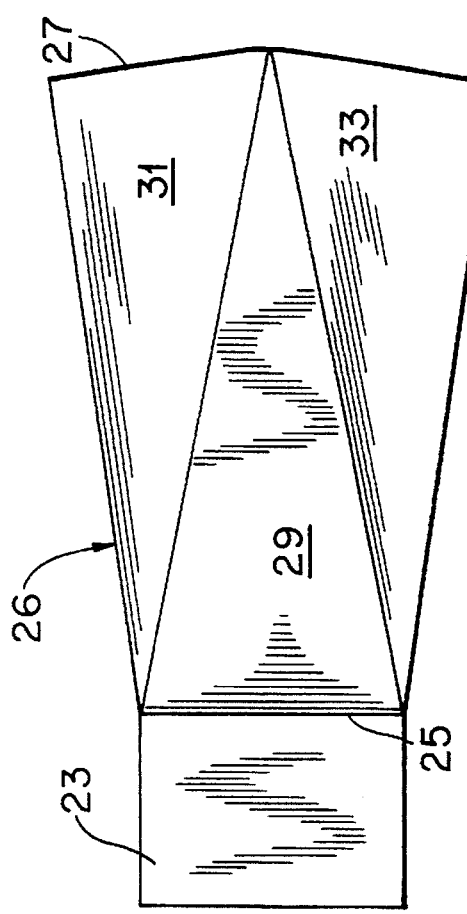
FIG. 4 is a top or plan view of a first lift means or ramp in accordance with a preferred embodiment of the invention.
Figure 5:
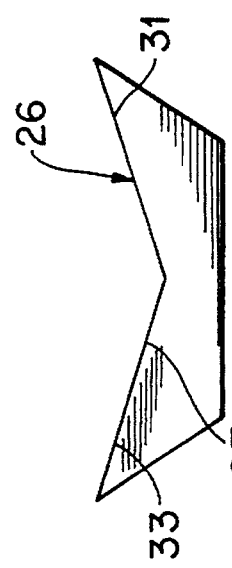
FIG. 5 is an end view of the lift means or ramp shown in FIG. 4.

FIG. 4 is a plan view of a flat piece of sheet metal which has been cut into an appropriate shape for forming ramp 26, while FIG. 5 illustrates the configuration of the forward or discharge end of ramp 26 as viewed from the discharge end of conveyor 10. As shown more clearly in FIG. 4, the ramp 26 includes a relatively flat portion 23 which abuts the bottom 22 of conveyor 10 and has the same horizontal or near horizontal slope as conveyor 10. The flat portion 29 converges toward the apex of a pair of sloping portions 31 and 33 which flare outwardly and upwardly into an abutting relationship with side walls 18 and 20. Those portions 31 and 33 terminate in the V-shaped end portion shown in FIG. 5.

Figure 6:
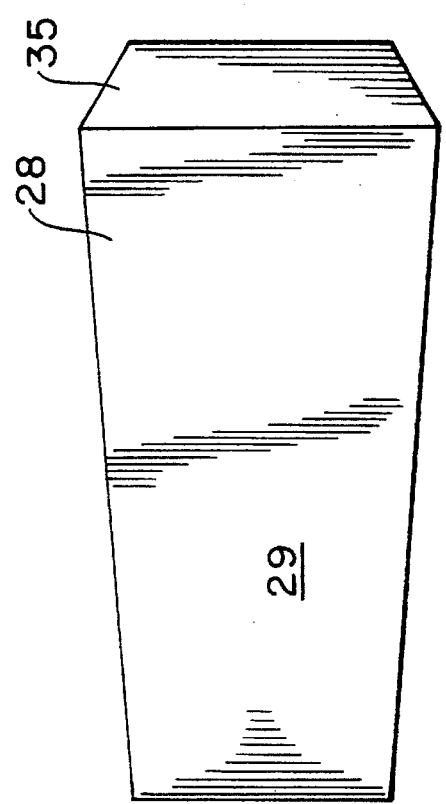
FIG. 6 is a top or plan view of a second lift means or ramp in accordance with a preferred embodiment of the invention.

FIG. 6 shows a plan for the relatively flat second ramp 28. That ramp includes a base 29 and support portion 35 which is folded or bent so that its outer edges are abutting side walls 18 and 20.

Figure 7:
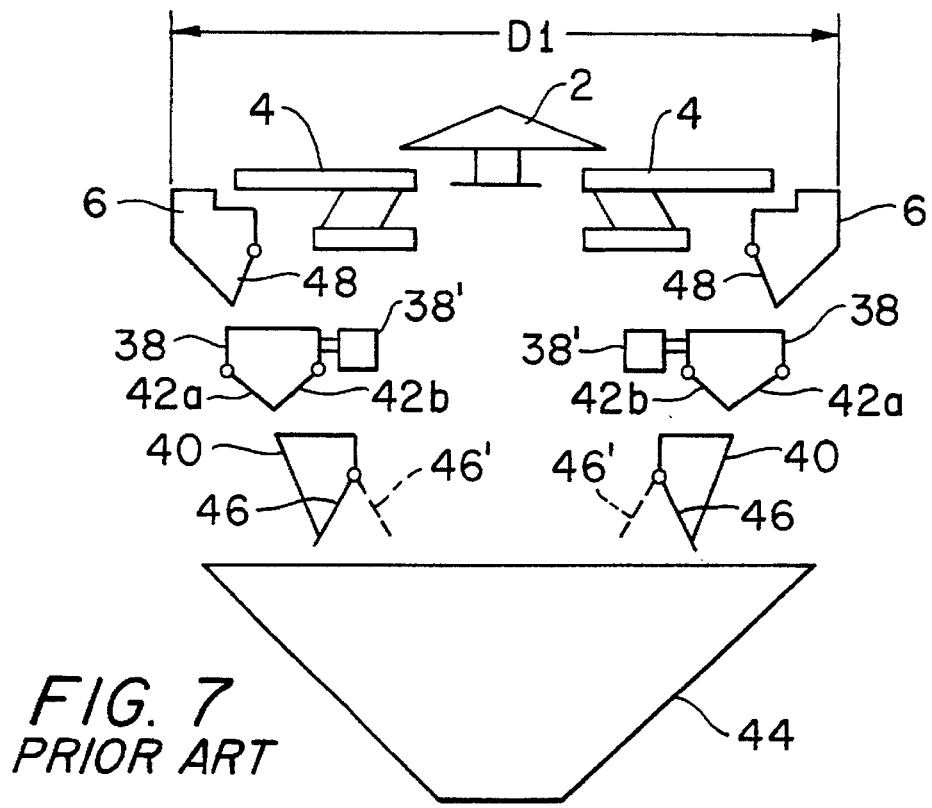
FIG. 7 is a schematic side view illustrating a prior art combination weigher; and, FIG. 8 is a sectional top or plan view of the prior art weigher shown in FIG. 7 with the control means shown schematically.
Figure 8:
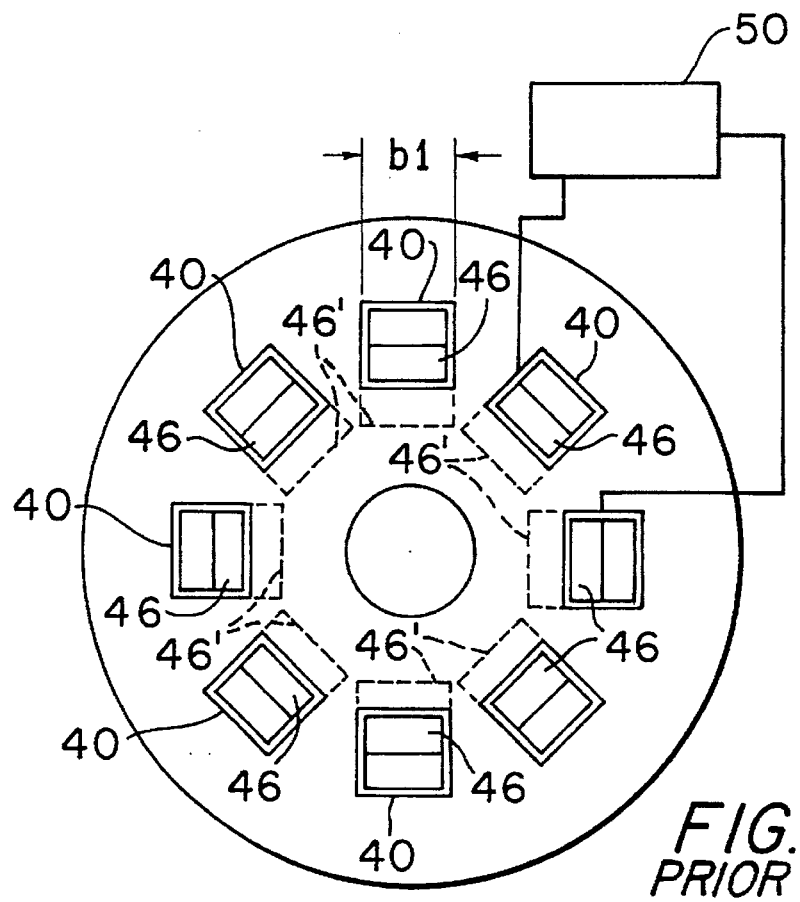

FIGS. 7 and 8 show a prior art combination weigher. As shown, a plurality of electromagnetic feeders 4 are radially arranged around a conventional dispersion feeder 2 and a feed hopper 6 is disposed under the distal end of each vibrating conveyor 4. A weight hopper 38 and associated load cell 38' are disposed under each feed hopper 6 and an auxiliary hopper 40 is disposed under each weight hopper 38. The feed, weight and auxiliary hoppers 6, 38 and 40 are respectively arranged angularly in concentric fashion. Each weight hopper 38 has an outer gate 42a for discharging product directly downward and an inner gate 42b for feeding product into the underlying auxiliary hopper 40. Accordingly, the auxiliary hoppers 40 are arranged angularly under the inner gates 42b. A collection chute 44 is disposed under the auxiliary hoppers 40 for collecting product which is discharged from weight hoppers 38 and/or auxiliary hoppers 40. Each auxiliary hopper 40 has a discharge gate 46 adapted to open inwardly as shown in phantom 46 and each feed hopper 6 also has a similar discharge gate 48.

A combination weigher with the aforementioned arrangement of weight hoppers 38 and auxiliary hoppers 40 requires a collection chute of relatively large diameter at its upper end. On the one hand, assuming the gate 46 of each auxiliary hopper 40 has a width b1 as shown in FIG. 8, the auxiliary hoppers must be positioned so that the lower edges of the opened gates 46 never project inwardly beyond a corresponding regular polygon having a side length b1, in order to ensure that the gate 46 of each hopper may open without any interference from the other gates 46. On the other hand, since each auxiliary hopper 40 is disposed directly under the inner gate 42b of a corresponding weight hopper 38, the collection chute 44 must have a diameter sufficiently large to completely collect the product discharged from the outer gates 42a of weight hoppers 38. While the gate width b1 may be reduced, this will result in reduction of the flow rate of product which causes undesirable reduction in machine efficiency.

The box 50 shown schematically in FIG. 8, includes means for recording a target weight, control means for determining which of the weigh hoppers is in a ready state as well as generating and comparison means for generating the combination of weights in the weight hoppers which are in the ready state and comparing the values with the predetermined target weight. The system in box 50 also includes means for selecting a combination of weight hoppers having a combined weight which most nearly approximates the target weight. The box 50 also includes means for dumping the selected weight hoppers and for initiating a refilling of those hoppers. The details of the aforementioned means are clearly shown and described in the aforementioned patents on combination weighers which are incorporated herein by reference. Such means are within the skill of a person of ordinary skill in the art. It should also be recognized that the distribution system disclosed and claimed herein may be used in connection with combination weighers of other designs as well as in other applications wherein solid flowable product is delivered to a plurality of locations in a relatively uniform amount.

While the invention has been described in connection with its preferred embodiment, it should be recognized that changes and modifications may be made without departing from the scope of the appended claims.

What is claimed is:

1. A combination weigher for weighing a plurality of articles of product having varying weights and delivering a collection of the weighed articles having a combined weight which most nearly approximates a predetermined weight, having a plurality of weigh hoppers, each of which receives and weighs a fraction of the collection, means for recording a predetermined target weight, control means for determining which of said weigh hoppers is in a ready state, generating and comparison means for generating the values of combinations of weights in the weigh hoppers which are in the ready state and comparing the values with the predetermined target weight and for selecting combinations of weigh hoppers having a combined weight which most nearly approximates the target weight, product receiving means and means for unloading the weigh hoppers of the selected combination for delivery to the product receiving means and means for loading the weigh hoppers which were unloaded, the improvement comprising an elongated trough having an inlet end, a discharge end and a pair of spaced apart walls; means for vibrating the trough to enhance a flow of material along said trough; first and second lift means extending across said trough between said side walls disposed between said inlet end and said outlet end for elevating essentially all of the particulate material to thereby slow the flow of material, and said first of said sift means comprising a relatively shallow ramp which abuts the side walls of said trough and extends across said trough between said side walls and is disposed between said inlet and said outlet end, and said ramp including entrance and exit ends and defining a relatively flat surface across its width at its entrance end and converging into a V-shaped exit end; said second lift means comprising a relatively shallow ramp which defines a relatively flat surface across the width of said trough and abutting the sides of said trough so that all of the particulate material flowing along said trough passes over said second lift means to further slow the flow of material, whereby said sift means regulates the flow of particulate material so that a trickle of material is delivered to one of the Weigh hoppers of the combination weigher.

2. A conveyor for conveying a mass of relatively free flowing particulate material to a weigh hopper in a combination weigher comprising:

an elongated trough having an inlet end, a discharge end, and a pair of spaced apart walls;

means for vibrating the trough to enhance a flow of material along said trough;

first lift means comprising a relatively shallow ramp which abuts the side walls of said trough and extends across said trough between said side walls and is disposed between said inlet and said outlet ends, and said ramp including entrance and exit ends and defining a relatively flat surface across its width at its entrance end and converging into a V-shaped exit end;

second lift means comprising a relatively shallow ramp which defines a relatively flat surface across the width of said trough and abutting the sides of said trough, so that all of the particulate material flowing along said trough passes over said second lift means to further slow the flow of the material whereby said first and second lift means regulate the flow of particulate material so that a trickle of material is delivered to one of the weigh hoppers of the combination weigher.

3. A conveyor for conveying a mass of relatively free flowing particulate material to a weigh hopper in a combination weigher or the like according to claim 2 which includes a pair of side wall extensions adjacent to a first of said lift means extending upwardly for preventing material which flows over said lift means from flowing over the side walls of said trough.

4. A conveyor for conveying a mass of relatively free flowing particulate material to a weigh hopper in a combination weigher or the like according to claim 2 which includes a pair of side wall extensions adjacent to said first and said second lift means extending upwardly and longitudinally for preventing material which flows over either of said lift means from flowing over the side walls of said trough.

\* \* \* \* \*